US008763020B2

(12) United States Patent
Toebes et al.

(10) Patent No.: US 8,763,020 B2
(45) Date of Patent: Jun. 24, 2014

(54) DETERMINING USER ATTENTION LEVEL DURING VIDEO PRESENTATION BY MONITORING USER INPUTS AT USER PREMISES

(75) Inventors: John Toebes, Cary, NC (US); Philip Clifford Jacobs, Windham, NH (US); Guido Jouret, Mountain View, CA (US); Matthew Kuhlke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 744 days.

(21) Appl. No.: 12/251,233

(22) Filed: Oct. 14, 2008

(65) Prior Publication Data

US 2010/0095317 A1    Apr. 15, 2010

(51) Int. Cl.
*H04H 60/32* (2008.01)
(52) U.S. Cl.
USPC ...................... 725/14; 725/9; 725/13; 725/16
(58) Field of Classification Search
USPC ........................................... 725/9, 13, 14, 16
See application file for complete search history.

(56) References Cited

U.S. PATENT DOCUMENTS

| | | | | |
|---|---|---|---|---|
| 6,457,010 | B1 * | 9/2002 | Eldering et al. | 707/10 |
| 7,343,365 | B2 | 3/2008 | Farnham et al. | |
| 7,624,416 | B1 * | 11/2009 | Vandermolen et al. | 725/109 |
| 2002/0095676 | A1 * | 7/2002 | Knee et al. | 725/46 |
| 2002/0178257 | A1 | 11/2002 | Cerrato | |
| 2005/0099492 | A1 | 5/2005 | Orr | |
| 2007/0124296 | A1 | 5/2007 | Toebes | |
| 2007/0244969 | A1 | 10/2007 | Knight et al. | |
| 2008/0034085 | A1 * | 2/2008 | Chawla et al. | 709/224 |
| 2008/0049922 | A1 | 2/2008 | Karniely | |
| 2008/0126420 | A1 * | 5/2008 | Wright et al. | 707/104.1 |
| 2008/0320082 | A1 | 12/2008 | Kuhlke et al. | |
| 2009/0007200 | A1 * | 1/2009 | Amento et al. | 725/100 |

OTHER PUBLICATIONS

U.S. Appl. No. 11/947,298, filed Nov. 29, 2007, Toebes et al.
U.S. Appl. No. 12/116,026, filed May 6, 2008, Toebes et al.
U.S. Appl. No. 12/109,549, filed Apr. 25, 2008, Toebes et al.
U.S. Appl. No. 12/110,224, filed Apr. 25, 2008, Toebes et al.
U.S. Appl. No. 12/110,238, filed Apr. 25, 2008, Davi et al.
U.S. Appl. No. 12/181,136, filed Jul. 28, 2008, Davi et al.
Toebes, "Enabling a Richer Video Experience With Metadata", W3C Video on the Web Workshop, Dec. 12-13, 2007, San Jose, California and Brussels, Belgium [online], [retrieved on Apr. 9, 2008]. Retrieved from the Internet: <URL: http://www.w3.org/2007/08/video/positions/Cisco_MSG.html>, pp. 1-4.

* cited by examiner

*Primary Examiner* — Nicholas Corbo
(74) *Attorney, Agent, or Firm* — Leon R. Turkevich

(57) ABSTRACT

In one embodiment, a method comprises identifying, by an apparatus at a user premises, a presentation of an addressable video stream to a user; detecting by the apparatus whether the user has supplied a user input, relative to the presentation, to at least one user input device; the apparatus selectively associating each user input detected relative to the presentation with a corresponding identified position of the addressable video stream; and generating, by the apparatus, a data structure enabling identification of an attention level by the user toward at least a portion of the addressable video stream, the data structure specifying an identifier for the addressable video stream and specifying whether the user supplied any user input relative to the presentation, including selectively adding to the data structure at least one user input and the corresponding identified position.

22 Claims, 6 Drawing Sheets

| 40d | Video ID=37513 (50d) | Inputs=No (72) | Net Attention Level=+2 (84) |
|---|---|---|---|

Figure 4A

| Position, 58 | User Input, 56 | User Input Attention Level Metric, 90 | Weighting Factor, 93 |
|---|---|---|---|
| Video ID=12345 (50a) | Inputs = Yes (76) | Net Attention Level=2 (84) | |
| 58a  0:03:20 | 56a Volume Increase | +3 | 8 |
| 58b  0:04:55 | 56b Maximize Screen (from Picture in Picture) | +5 | 10 |
| 58d  0:07:33 | 56d Send IM to Bob ("Awesome Shot") | +6 | 9 |
| 58c  0:07:40 | 56e Bookmark Scene | +6 | 6 |
| 0:16:00 | Volume Decrease | -2 | 5 |
| 0:16:33 | VoIP Call to John (John not Viewing Video) | -5 | 7 |
| 0:19:25 | Send e-mail Message (No Relevant Text) | -6 | 9 |
| 0:24:20 | HTTP Request (Response Includes Relevant Player Statistics) | +3 | 3 |
| 0:27:15 | Electronic Game (Unrelated) | -8 | 9 |

| 50b | Video ID=36524 | Inputs = Yes (76) | Net Attention Level = -8 (84) |
|---|---|---|---|
| 40b | 58c  0:00:16 | 56c Electronic Game (Unrelated) | -8 |

| 50c | Video ID=51324 | Inputs = Yes (76) | Net Attention Level = 7 (84) |
|---|---|---|---|
| 40c | 58f  0:00:18 | 56f HTTP Request (Matches Advertised URL) | +7 |

Figure 4B

DETERMINING USER ATTENTION LEVEL DURING VIDEO PRESENTATION BY MONITORING USER INPUTS AT USER PREMISES

TECHNICAL FIELD

The present disclosure generally relates to determining the attention level of a user viewing an addressable video stream, for example a broadcast television program or a movie, at his or her user premises.

BACKGROUND

Video information service providers, video programmers, and advertisers desire to know whether viewers are paying attention to the video presentations they are viewing. The knowledge of whether viewers are paying attention to certain video presentations such as broadcast programs or movies often is used by video information service providers (e.g., television broadcasting companies, video service providers, etc.) or advertising agencies to derive advertisement revenue. However, heretofore it has been relatively difficult to measure viewer attention to video presentations. Audience measurement techniques (used, for example by Nielsen Media Research) request a group of viewers to maintain a log or "diary" of shows they have viewed. Audience measurement techniques also may include installation of a monitoring device that tracks the viewing habits of the viewers: such audience measurement techniques, however, are used to determine the number of viewers that are watching a given program, and do not measure whether the viewers are paying attention to the video presentations. Hence, aside from relying on viewer logs completed by viewers, video programmers and advertisers have been relatively unable to determine how much attention viewers have given to a particular video presentation.

BRIEF DESCRIPTION OF THE DRAWINGS

Reference is made to the attached drawings, wherein elements having the same reference numeral designations represent like elements throughout and wherein:

FIGS. 4A and 4B illustrate example data structures generated by the apparatus of FIG. 2, according to an example embodiment.

DESCRIPTION OF EXAMPLE EMBODIMENTS

Overview

Figure 1:
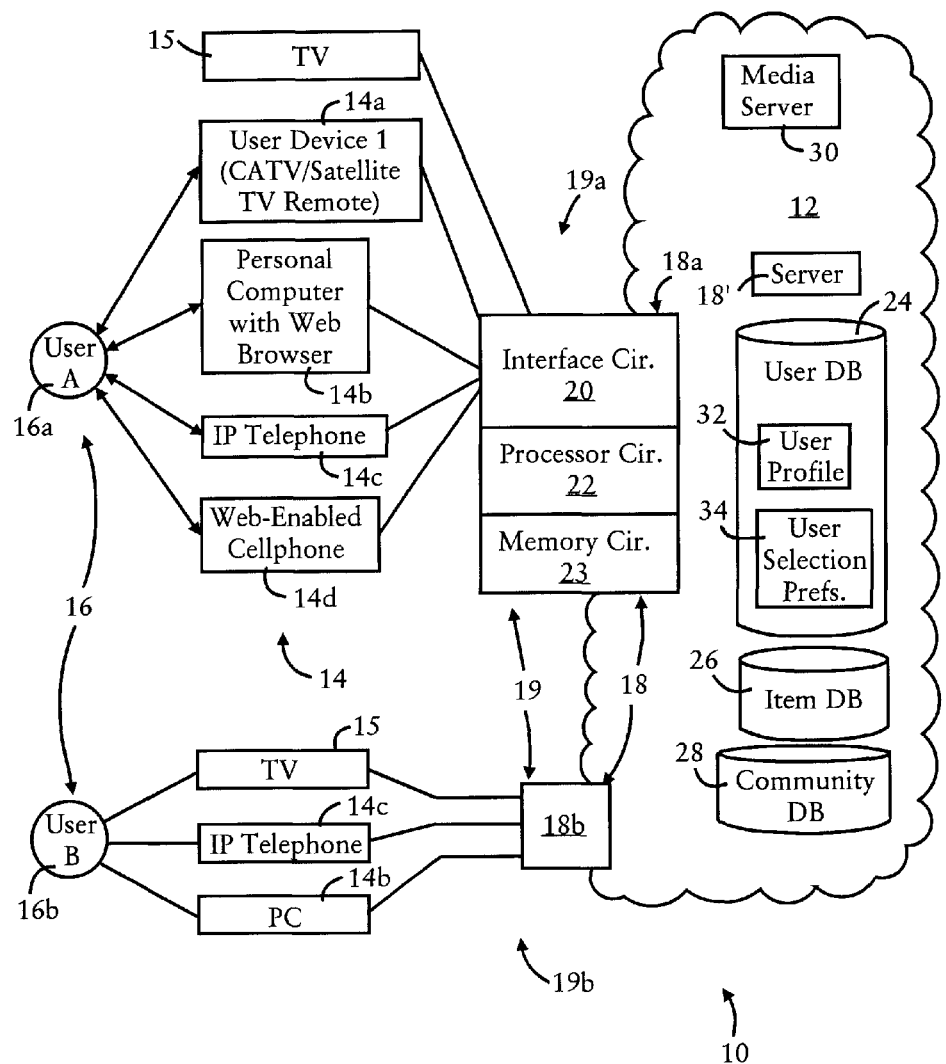
FIG. 1 illustrates an example system having an apparatus for enabling identification of an attention level of a user toward an addressable video stream, according to an example embodiment.

In one embodiment, a method comprises identifying, by an apparatus at a user premises, a presentation of an addressable video stream to a user at the user premises; detecting by the apparatus whether the user has supplied a user input, relative to the presentation, to at least one user input device at the user premises; the apparatus selectively associating each user input detected relative to the presentation with a corresponding identified position of the addressable video stream; and generating, by the apparatus, a data structure enabling identification of an attention level by the user toward at least a portion of the addressable video stream, the data structure specifying an identifier for the addressable video stream and specifying whether the user supplied any user input relative to the presentation, including selectively adding to the data structure at least one user input and the corresponding identified position.

In another embodiment, an apparatus is located at a user premises and comprises a device interface circuit and a processor circuit. The device interface circuit is configured for detecting a presentation of an addressable video stream to a user at the user premises, and detecting whether the user has supplied a user input to at least one user input device at the user premises. The processor circuit is configured for identifying the presentation of the addressable video stream and selectively associating each user input detected relative to the presentation with a corresponding identified position of the addressable video stream. The processor circuit further is configured for generating a data structure enabling identification of an attention level by the user toward at least a portion of the addressable video stream, the data structure specifying an identifier for the addressable video stream and specifying whether the user supplied any user input relative to the presentation, the processor circuit further configured for selectively adding to the data structure at least one user input and the corresponding identified position.

DETAILED DESCRIPTION

Particular embodiments disclosed herein enable an apparatus at a user premises to detect whether a user, presented with an addressable video stream, supplies a user input to at least one user input device at the user premises relative to the presentation of the addressable video stream. The addressable video stream can be implemented as any digital video stream for a given piece of content (e.g., a video clip, a broadcast television program, an advertisement inserted within a broadcast television program or a DVD menu, etc.). The addressable media stream can be downloaded from a network in the form of streaming media, or retrieved from a local storage medium such as a DVD or a mass storage device such as a hard disk drive or a flash memory (e.g., a 4 GB USB memory card). The term "addressable" as used herein with respect to a media stream refers to a media stream having attributes, for example a time index, that enables identification of a time instance relative to a fixed "point" (i.e., location or position) within the media stream. Hence, an addressable media stream can present a sequence of events that is deterministic and repeatable.

The particular embodiments disclosed herein also enable the apparatus to associate each user input, detected relative to the presentation of the addressable video stream, with a corresponding identified position of the addressable video stream that can coincide with the instance that the corresponding user input is detected by the apparatus; the corresponding identified position also can be determined as relevant to the user input, even if the user input is supplied by the user after presentation of the addressable video stream, based on detecting matching attributes between the user input and the identified position (e.g., dialed number matching advertised number, etc.). Hence, the apparatus can generate a data structure that specifies an identifier for the addressable video stream (e.g., by title, catalog number, etc.), and specifies whether the user supplied any user input relative to the presentation of the addressable video stream.

Hence, the data structure generated by the apparatus specifies the identified addressable video stream and whether the user supplied any input during or after the presentation thereof: the resulting association between the identified addressable video stream and whether the user supplied any input relative to the presentation thereof enables identification (either within the apparatus or remotely) of an attention level by the user toward a least a portion of the addressable video stream. For example, if the data structure specifies that there is no user input either during the presentation or a prescribed time after the presentation (e.g., after a prescribed voting cutoff time), indicating a determined absence of any user input during the presentation or after a prescribed voting interval, a determination can be reached that the user presented with the addressable video stream demonstrated a relatively moderate level of attention to the addressable video stream based on the determined absence of any other user input that would distract the user. Alternately, if the data structure specifies multiple user inputs, the user inputs can be analyzed to determine if they are display control commands indicating an increase or decrease in the user attention level; any user inputs that are not display control commands also can be analyzed to determine whether they are relevant to the content presented in the addressable video stream (indicating a higher attention level), or unrelated to the content presented in the addressable video stream (indicating a lower attention level).

Hence, the particular embodiments enable automatic identification of an attention level by the user toward at least a portion of the addressable video stream based on generating a data structure that associates the identified addressable video stream with any detected actions by the user relative to the presentation of the addressable video stream. The data structure can be forwarded to a prescribed destination, for example a server configured for identifying the attention levels of the user toward the addressable video stream, a server configured for collecting and evaluating data for a marketing survey, or an advertisement system measuring advertising impact. The data structure also can be supplied to a system that can be configured for generating recommendations for the user based on accumulating socially relevant gestures that demonstrate preferences by the user. An example system that provides recommendations to users based on socially relevant gestures is disclosed in commonly-assigned, copending U.S. patent application Ser. No. 11/947,298, filed Nov. 29, 2007, entitled "Socially Collaborative Filtering". If the apparatus at the user premises is configured for performing attention level identification, the data structure can be updated with the determined attention levels and output to the prescribed destination, reducing processing requirements by the prescribed destination.

Hence, attention levels of an unlimited number of users can be collected for any video content (e.g., online videos, DVDs, broadcast television programs or movies, commercials, etc.), based on an apparatus at the user premises that identifies the video content presented to the user and that identifies whether any user input is detected relative to the presentation of the video content.

FIG. 1 illustrates an example system 10 having an apparatus 18 (e.g., 18a or 18b) for enabling identification of an attention level of a user 16 (e.g., 16a or 16b) toward an addressable video stream presented to the user 16 at the user premises 19 (e.g., 19a or 19b), according to an example embodiment. The system 10 includes an apparatus 18 (e.g., 18a or 18b), also referred to as a "server", configured for detecting user selection inputs from user devices 14 under that are the control of an identifiable user 16. Example user devices 14 can include a remote control 14a for an intelligent digital television system 15 at the user premises, a personal computer 14b having a web browser, an IP based telephone 14c (for example, a Voice over IP telephone), a web enabled cell phone 14d, and/or a wired or wireless game console 14e (illustrated in FIG. 2) configured for executing an identifiable electronic game.

A user 16 (e.g., 16a or 16b) can demonstrate his or her attention based on supplying an input to a given user input device 14. For example, an addressable video stream can be presented to a user display such as a television 15 or a personal computer 14b at a user premises 19 (e.g., 19a or 19b), either from a remote source such as a media server 30 or local media source such as a DVD 38 (illustrated in FIG. 2). A user can subjectively decide to either give full attention to the presentation of the addressable video stream, or divert at least part of his or her attention from the presentation of the addressable video stream to another activity, for example using the personal computer 14b for an instant messaging (IM) session or accessing a destination website (e.g., 18') via a network 12 (e.g., a content provider access network or an Internet Protocol (IP) based wide area network such as the Internet).

According to example embodiments, the apparatus 18 can identify a presentation of an addressable video stream to the user 16 at the user premises 19, and detect whether the user 16 supplies any user input to at least one of the user input devices 14 at the user premises 19 relative to the presentation of the addressable video stream (e.g., either during the presentation or within a prescribed time interval following the presentation). The apparatus 18 can generate a data structure that specifies an identifier for the addressable video stream, and that specifies whether the user supplied any user input relative to the presentation. The data structure can be forwarded to a prescribed destination, for example the server 18', that can collect the data structures from numerous sources (e.g., 18a, 18b) and identify from the respective data structures whether a relative attention level by the respective users 16 toward either the entire addressable video stream, or at least a portion of the addressable video stream. The attention levels for the respective users 16 can be stored in an item database 26 for storage of statistical information enabling marketing and advertising analysis, etc., in order to identify portions of the addressable media streams that capture the most attention by the users 16, as opposed to portions of the addressable media streams that command little attention by the users 16. If the data structures include user identifiers that enable the server 18' to distinguish among different users (e.g., by IP address, user alias, etc.), the server 18' also can update a user profile 32 and/or user selection preferences 34 stored in a user database 24. Hence, the updated user selection preferences 34 can be used for identifying recommended content for a given user, as described in the above-identified U.S. patent application Ser. No. 11/947,298. The attention levels identified by the server 18' also can be used to populate other databases, for example a community database 28 associated with social networking sites.

Hence, the data structures generated by the servers 18 at the user premises 19 enable remote servers 18' to identify the attention level of the respective users 16 toward at least a portion of the addressable video stream the identified in the data structures. As described below, the attention level also can be identified locally by the local servers 18 and added to the data structures, if preferred.

Figure 2:
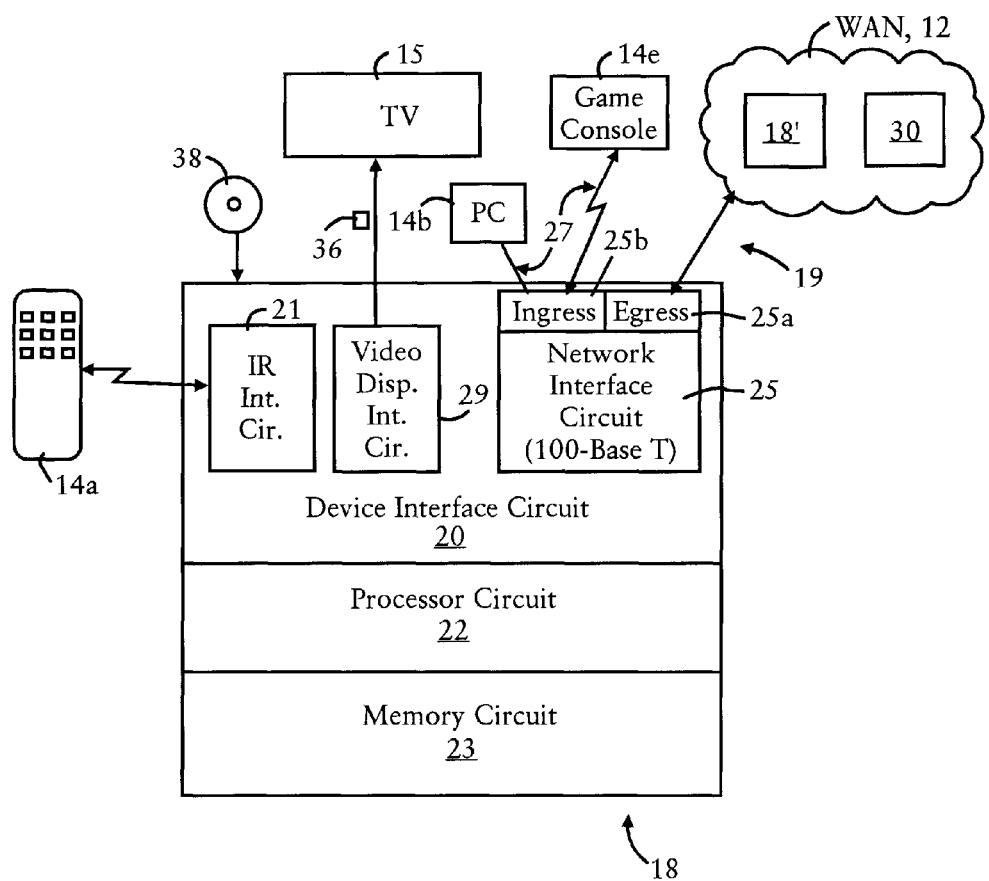
FIG. 2 illustrates an example apparatus from the system of FIG. 1 and configured for enabling identification of an attention level of a user, according to an example embodiment.

FIG. 2 illustrates an example server 18 from the system of FIG. 1 and configured for enabling identification of an attention level of a user, according to an example embodiment. The server 18 installed at the user premises (i.e., customer premises) 19 can be implemented in numerous forms, for example a consumer set-top box configured for supplying a media stream 36 to a consumer television 15; the server 18 also can be implemented as a user premises router, for example a commercially-available Linksys® router; the server 18 also can be implemented as a user premises device that integrates operations of a consumer set-top box and a commercially available user premises router. The server 18 also can be implemented as a mobile router implemented in a vehicle, where the vehicle (e.g., mobile home, van, truck etc.) serves as the user premises 19 for the user devices 14 and 15 located within the vehicle. An example mobile router is the commercially available Cisco 3200 Series Wireless and Mobile Router, from Cisco Systems, Inc., San Jose, Calif.

The server 18 includes a device interface circuit 20, a processor circuit 22, and a memory circuit 23. The device interface circuit 20 is configured for detecting a presentation of an addressable video stream 36 to a user 16 at the user premises 19. The device interface circuit 20 also is configured for detecting inputs that are supplied by a user 16 to at least one user input device 14 at the user premises 19.

The device interface circuit 20 can include a network interface circuit 25 (implemented for example as a 100 Mb per second Ethernet or 100-Base T interface circuit, a cable modem, and/or a wireless IEEE 802.11 transceiver) having at least an egress port 25*a* (e.g., a 100-Base T interface, a cable modem interface, and/or a wireless IEEE 802.11 transceiver) for sending and receiving data to and from a wide area network 12, for example a content provider network having access to the Internet. The device interface circuit 20 also can include different interface circuitry depending on implementation (e.g., a commercially available user premises router and/or a set-top box) in order to detect presentation of the addressable video stream 36 and user inputs. For example, if the server 18 is implemented as a user premises network router, the network interface circuit 25 also can include an ingress port 25*b* configured for establishing wired or wireless links 27 with user devices 14 (e.g., a personal computer 14*b* and/or a game console 14*e*). As described below, the server 18 implemented as a user premises router can identify an addressable video stream 36 that is presented to the user 16 via the personal computer 14*b*.

If the server 18 is configured for providing set-top box functionality, the device interface circuit 20 can include an infrared interface circuit 21 configured for receiving user selection input from a remote control 14*a*, and a video display interface circuit 29 configured for supplying video display signals to the television 15. The device interface circuit 20 also can include disc player circuitry that enables retrieval of the addressable video stream 36 from a DVD 38, or a data link interface that can communicate with an external DVD player.

The processor circuit 22 is configured for identifying the presentation of the addressable video stream 36. For example, the processor circuit 22 can be configured for identifying the presentation of the addressable video stream 36 to the user 16 based on parsing metadata tags within the addressable video stream 36 and that describe the content of the addressable video stream 36, for example in the case where the addressable video stream 36 is retrieved from the DVD 38, or is supplied to the personal computer 14*b* from the media server 30; the processor circuit 22 also can be configured for identifying the addressable video stream 36 in response to user navigation inputs supplied by the user 16 via the remote control device 14*a*. As described in further detail below with respect to FIG. 5, the processor circuit 22 can be configured for identifying multiple addressable video streams 36 that are embedded within a single media stream 52, for example a broadcast television show (e.g., 36*a*) having interleaved commercials (e.g., 36*b*, 36*c*, and 36*d*) within the media stream 52.

The processor circuit 22 also is configured for selectively associating each user input that is detected by the device interface circuit 20 relative to the presentation with a corresponding identified position of the addressable video stream. In particular, if the device interface circuit 20 detects a user input that is supplied by the user 16 to at least one user interface device 14 during presentation of the addressable video stream 36, the processor circuit 22 can associate the user input with an identified position of the addressable video stream that coincides with the time instance that the user input is detected by the device interface circuit 20. If the device interface circuit 20 detects a user input that is supplied by the user to at least one user interface device 14 after presentation of the addressable video stream 36, the processor circuit 22 can associate the user input with an identified position of the addressable video stream based on determining a relevance between the user input and the corresponding identified position (e.g., a user comment that reviews or rates the addressable video stream or the scene described at the corresponding identified position, voting for a contestant by calling a destination telephone number matching an voting number advertised at the corresponding identified position, etc.).

The processor circuit 22 also is configured for generating and storing in the memory circuit 23 a data structure 40, illustrated in FIGS. 4A and 4B, that enables identification of an attention level by the user 16 toward at least a portion of the addressable video stream. If desired, the processor circuit 22 also can be configured for identifying the attention level for at least an identified position within the addressable video stream 36, and adding the identified attention level in the form of an attention level metric to the data structure for the identified addressable video stream. Hence, the processor circuit 22 can forward the data structure specifying at least the addressable video stream and any detected user inputs, and optionally any identified attention level metrics, to a prescribed destination server 18' for identification and collection of the attention level metrics related to the addressable video stream 36.

Any of the disclosed circuits of the server 18 (including the device interface circuit 20, the processor circuit 22, the memory circuit 23, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 23) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor circuit. The memory circuit 23 can be implemented, for example, using a non-volatile memory such as a programmable read only memory (PROM) or an EPROM, and/or a volatile memory such as a DRAM, etc.

Further, any reference to "outputting a data structure" (or the like) can be implemented based on storing that data structure in a tangible memory medium in the disclosed apparatus (e.g., in the memory circuit 23 or a transmit buffer in the network interface circuit 25). Any reference to "outputting a data structure" (or the like) also can include electrically transmitting (e.g., via wired electric current or wireless electric field, as appropriate) the data structure stored in the tangible memory medium to another network node via a communications medium (e.g., a wired or wireless link, as appropriate) (optical transmission also can be used, as appropriate). Similarly, any reference to "receiving a data structure" (or the like) can be implemented based on the disclosed apparatus detecting the electrical (or optical) transmission of the data structure on the communications medium, and storing the detected transmission of the data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

Figure 3A:
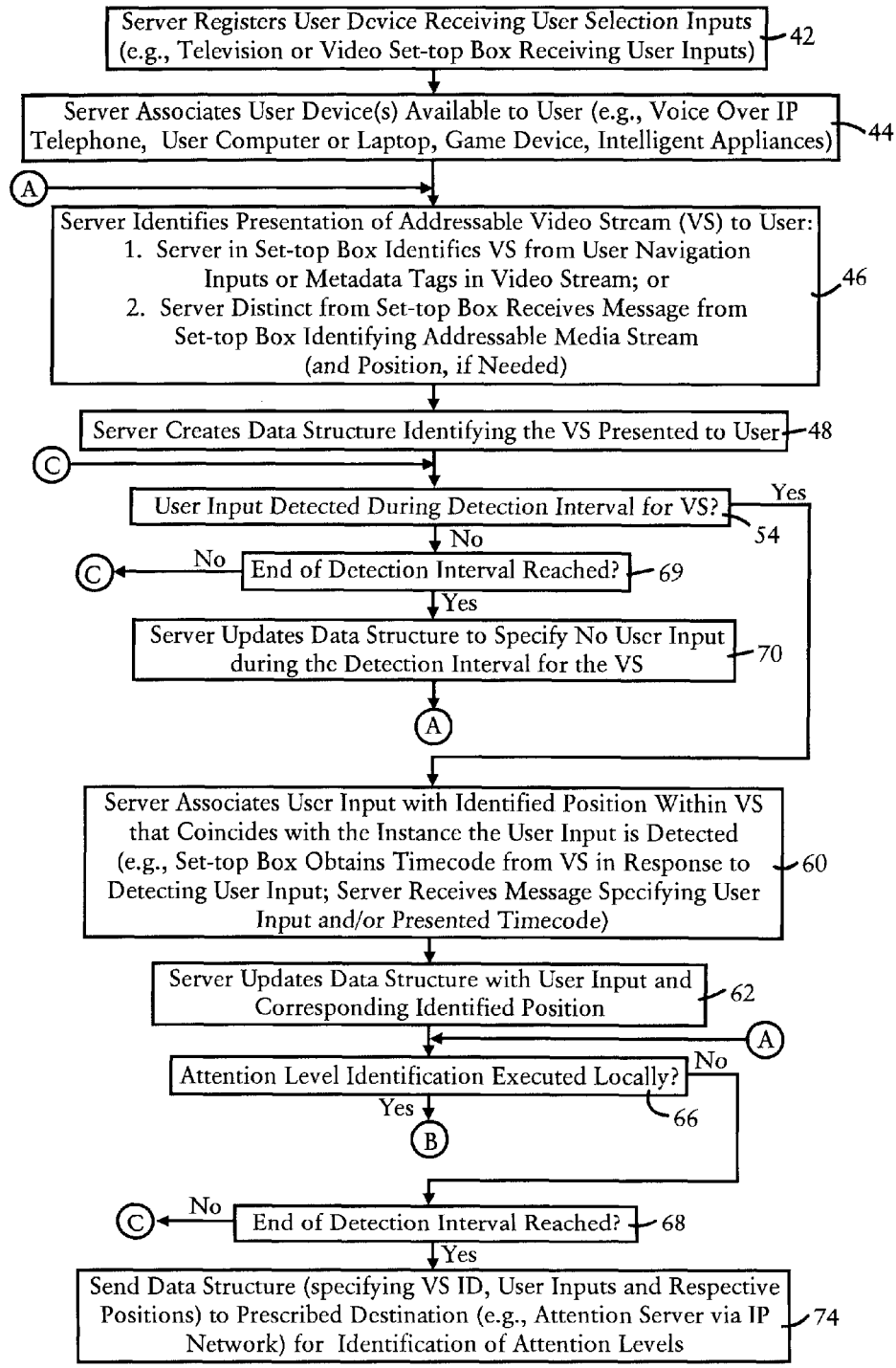
FIGS. 3A and 3B illustrate an example method by the apparatus of FIG. 2, according to an example embodiment.
Figure 3B:
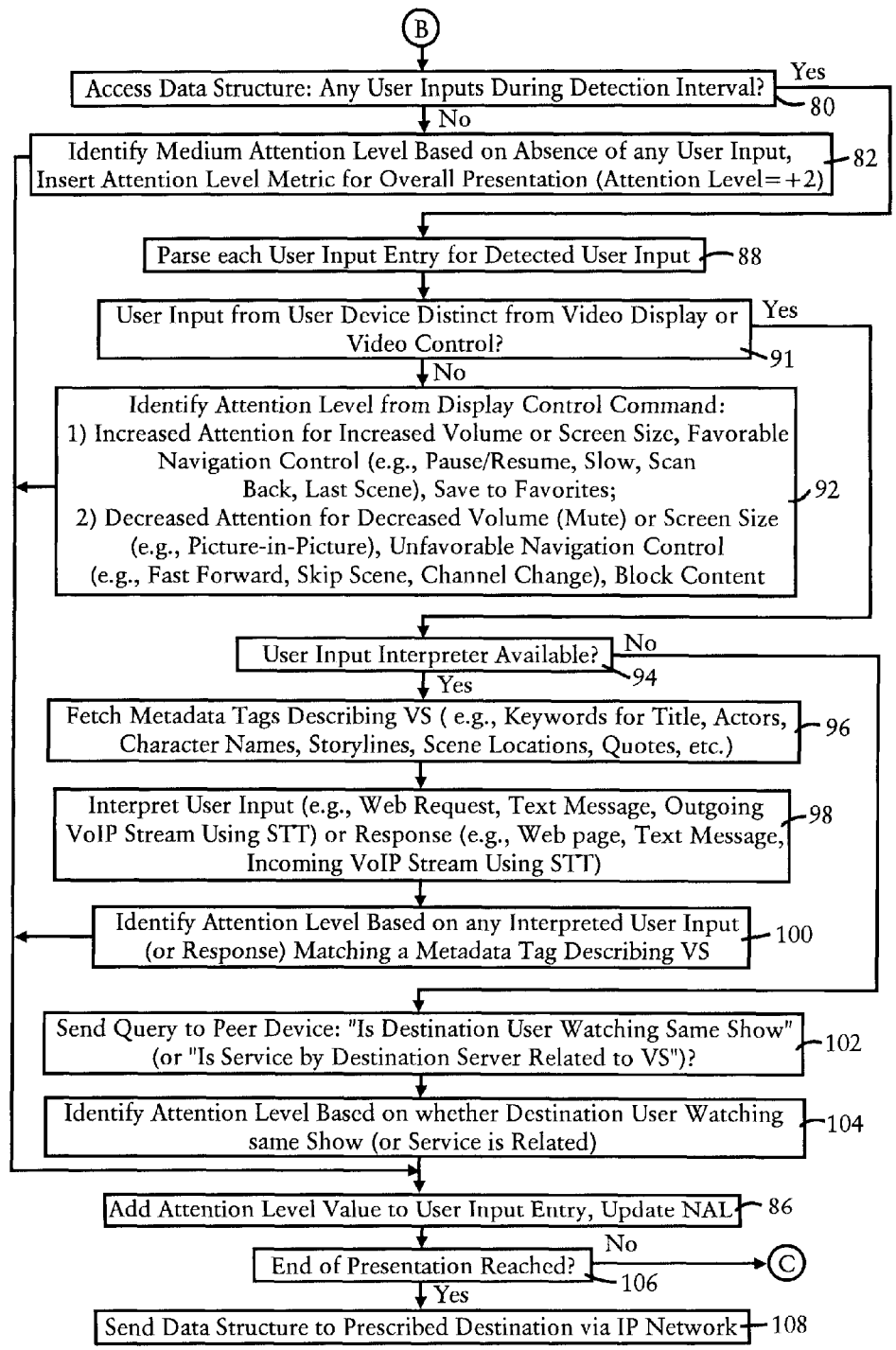

FIGS. 3A and 3B illustrate an example method by the apparatus (e.g., 18a) of FIGS. 1 and 2, according to an example embodiment. The steps described in FIGS. 3A and 3B can be implemented as executable code stored on a computer readable storage medium (e.g., floppy disk, hard disk, ROM, EEPROM, nonvolatile RAM, CD-ROM, etc.) that are completed based on execution of the code by a processor circuit; the steps described herein also can be implemented as executable logic that is encoded in one or more tangible media for execution (e.g., programmable logic arrays or devices, field programmable gate arrays, programmable array logic, application specific integrated circuits, etc.).

As illustrated in FIG. 3A, the processor circuit 22 of the server 18 (e.g., server 18a at the user premises 19a) can register in step 42 each user device 14 that receives user selection inputs that are directly related to the control and presentation of an addressable video stream 36. For example, the processor circuit 22 can register the remote control 14a as a user video display control device used to control the presentation of an addressable video stream 36; the processor circuit 22 also can register a personal computer 14b for addressable video streams 36 that are supplied to the personal computer 14b, however for addressable video streams 36 that are not supplied to the personal computer 14b, the personal computer 14b also can be registered by the processor circuit 22 in step 44 as a "secondary" user device distinct from a video control device as registered in step 42. Hence, the processor circuit 22 registers in step 42 video control devices that enable a user to directly control presentation of an addressable video stream, such that the remote control 14a serves as a video control device for the presentation of addressable video streams 36 to the television 15, and the personal computer 14b serves as the video control device for the presentation of addressable video streams 36 to the personal computer 14b.

The processor circuit 22 registers in step 44 the "secondary" user devices that do not directly control presentation of an addressable video stream: such devices can include, for example, a Voice over IP telephone 14c, a user computer or laptop 14b that is not presenting the addressable video stream 36, a game console 14e such as the commercially available Microsoft Xbox 360, Sony Playstation 3, Nintendo DS™ or Wii™, or intelligent appliances (e.g., computer-controlled kitchen appliances, smart home components and accessories, etc.). The processor circuit 22 completes the registration of the user devices 14 in step 42 and 44 by creating and storing in the memory circuit 23 appropriate data structures (not shown) that identify the user devices, for example based on interface identifiers, user registration, etc.). If desired, a user identifier or "alias" can be recorded by the processor circuit 22 to distinguish the user 16a from other users at the same customer premises 19a that may use the same user input devices 14. An example of distinguishing users that share user devices in described in commonly-assigned, copending U.S. patent application Ser. No. 12/116,026, filed May 6, 2008, entitled "Identifying User by Measuring Pressure of Button Presses on User Input Device."

The device interface circuit 20 of the server 18 (e.g., 18a) detects in step 46 the presentation of an addressable video stream 36 to the user (e.g., 16a), and the processor circuit 22 of the server 18 (e.g., 18a) identifies in step 46 the presentation of the addressable video stream 36 to the user 16 (e.g., 16a). In particular, the device interface circuit 20 forwards all detected user inputs and/or any metadata tags within the addressable video stream 36 to the processor circuit 22. For example, if the server 18 is configured as a set-top box or other apparatus that includes video circuitry 29 for supplying the addressable video stream 36 to a display device 15 or 14b, the processor circuit 22 can be configured for identifying the addressable video stream 36 based on user navigation inputs detected by the device interface circuit 20 or metadata tags that are embedded within the addressable video stream 36 detected by the device interface circuit 20. Alternately, if the server 18 is distinct from the apparatus supplying the addressable video stream 36, for example in the case of the server 18 implemented as a customer premises router and the apparatus supplying the addressable video stream 36 implemented as a set-top box or a DVD player, the set-top box and/or DVD player can be configured to supply to the server 18 a message that identifies the addressable media stream 36. As described below, the set-top box and/or DVD player (distinct from the server 18) also can be configured for periodically sending position synchronization messages that specify the identifier of the addressable media stream 36 and the currently-presented timecode, enabling the server 18 to independently keep track of the positions of the addressable video stream 36 that are presented to the user 16 (e.g., 16a). The processor circuit 22 of the server 18 also can be configured for sending to the set-top box and/or DVD player a query requesting a position synchronization message.

In response to identification of the addressable video stream 36 in step 46, the processor circuit 22 of the server 18 (e.g., 18a) in step 48 creates and stores in the memory circuit 23 a data structure 40 that identifies the addressable video stream 36 presented to the user 16 (e.g., 16a).

FIGS. 4A and 4B illustrate example data structures 40 that are created by the processor circuit 22 and stored in the memory circuit 23, according to an example embodiment. As illustrated in FIGS. 4A and 4B, each of the data structures 40a, 40b, 40c and 40d specify a corresponding identifier 50 for an addressable video stream 36 presented to the user (e.g., 16a). The video identifier 50 uniquely identifies the corresponding addressable video stream, enabling any server within the system 10 to uniquely identify the addressable video stream 36 presented to the user. Hence, the processor circuit 22 creates a new data structure 40 for each corresponding addressable video stream 36 that is presented to the user, where initially the data structure 40 created in step 48 initially stores only the video identifier 50. As illustrated with respect to FIG. 5, the processor circuit 22 also can identify different addressable video streams 36 that may be combined within a single media stream 52.

Referring to FIG. 3A, the processor circuit 22 monitors in step 54 whether the device interface circuit 20 detects a user input 56 within a prescribed detection interval: the prescribed detection interval includes at least the presentation of the addressable video stream, and also can include a prescribed time interval following the end of the presentation of the addressable video stream. The prescribed time interval following the end of the addressable video stream can be established by metadata tags describing the addressable video stream (e.g., metadata specifying a two-hour deadline for submitting votes for contestants presented in the addressable video stream), can be set to a prescribed duration by the processor circuit 22, or according to a prescribed decay function.

Figure 5:
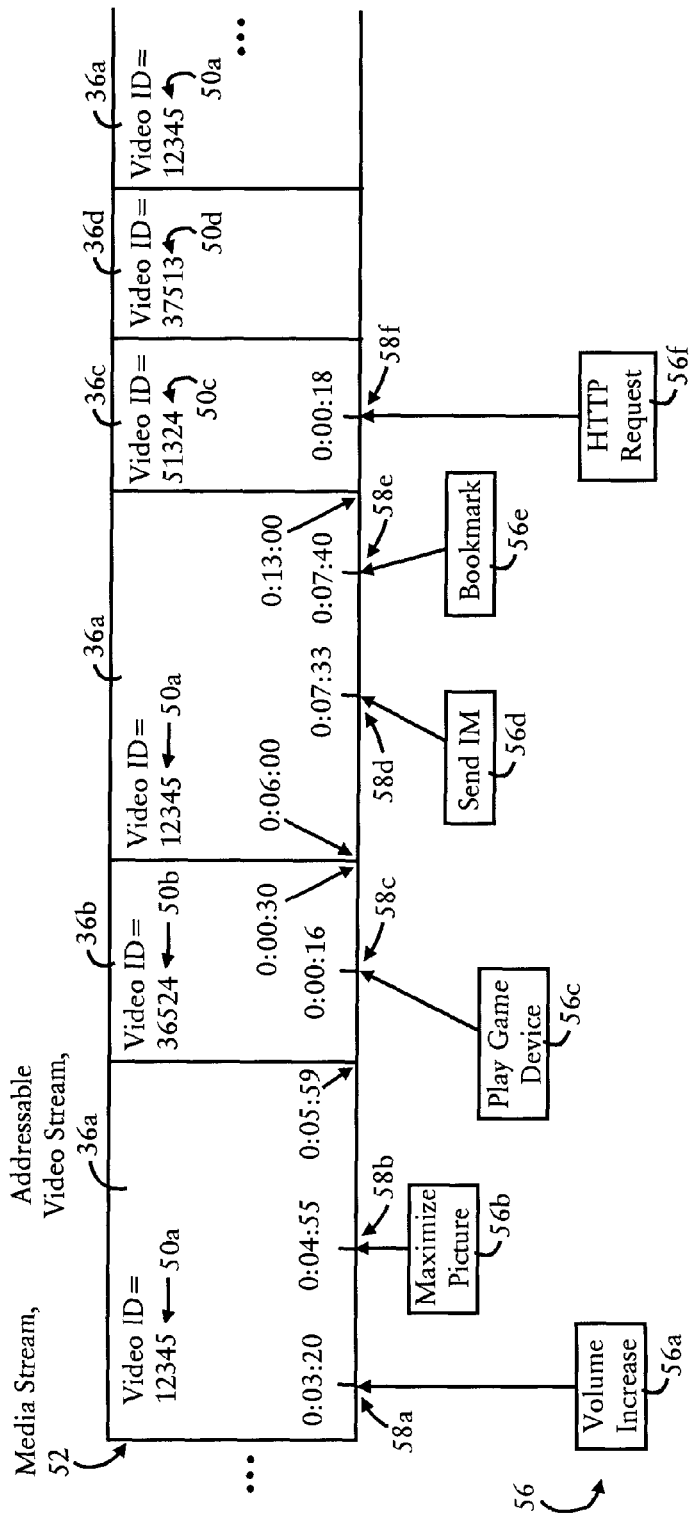
FIG. 5 illustrates detected user inputs that are associated with the respective identified positions of the addressable video stream, according to an example embodiment.

As illustrated in FIG. 5, the device interface circuit 20 can detect various user inputs 56 that may be supplied by the user 16 (e.g., 16a) via a different user devices 14. For example, the user input 56a illustrates the user 16a executing a volume change by increasing a volume of the addressable video stream 36 using the remote control 14a at a time instance coinciding with the identified position (i.e. timecode) 58a of "0:03:20" (i.e., three minutes and twenty seconds following the beginning of the addressable video stream 36a having the video identifier 50a of "12345"). The user input 56b illustrates the user 16a executing a display screen size change by maximizing the picture size using the remote control 14a at a time instance coinciding with the identified position 58b of "0:04:55".

Hence, in response to the device interface circuit 20 detecting in step 54 a user input (e.g., 56a), the processor circuit 22 can identify in step 60 the corresponding identified position (e.g., 58a) of the addressable video stream 36a coinciding with the time instance that the user input 56a was detected. As described previously, if the server 18a is configured for supplying the addressable video stream 36, the processor circuit 22 can simply obtain the corresponding identified position 58a from the addressable video stream; alternately, if the server 18a is distinct from a second device supplying the addressable video stream 36 (e.g., a DVD player or separate set-top box), the server 18a can receive from the second device a message that specifies the user input 56a and/or the presented timecode 58a. As described previously, the processor circuit 22 also can synchronize with the second device to independently determine in step 60 the presented timecode 58, based on periodically receiving messages from the second device specifying the presented timecode 58.

Hence, the processor circuit 22 can associate in step 60 each detected user input (e.g., 56a) with the corresponding identified position (e.g., 58a) of the addressable video stream 36a that was presented to the user 16a. The processor circuit 22 of the server 18a also updates in step 62 the data structure 40 created for the corresponding addressable video stream 36 (e.g., data structure 40a for addressable video stream 36a) by adding a user input entry 64. The user input entry 64 added in step 62 specifies the detected user input (e.g., 56a) and the corresponding identified position (e.g., 58a) identifying the instance within the identified addressable video stream 36a that the user input (e.g., 56a) supplied by the user 16a was detected by the device interface circuit 20. Assuming in step 66 that the processor circuit 22 is not configured for locally (i.e., internally) executing attention level identification (or assuming the processor circuit 22 is not configured for real-time attention level identification), the processor circuit 22 can continue to monitor for additional user inputs 56 if in step 68 the end of the presentation has not been reached. The end of the presentation can be detected in step 68 for example based on metadata tags within the addressable video stream 36 or an end of presentation identifier from a second device presenting the addressable video stream 36.

Hence, the server 18a can detect the user inputs 56a and 56b that are input by the user 16a at the respective positions 58a and 58b of the addressable video stream 36a, causing the processor circuit 22 to update the data structure 40a with the respective user input entries 64 illustrated in FIG. 4B.

At any time during the method illustrated in FIGS. 3A and/or 3B, the processor circuit 22 also can identify in step 46 whether a new addressable video stream 36 is being presented to the user 16a. For example, the processor circuit 22 can identify with respect to FIG. 5 that the media stream 52 switches from the addressable video stream 36a at the timecode "0:05:59" to another addressable video stream 36b having the video identifier value 50b of "36524", for example a commercial advertisement. A presentation of a new addressable video stream 36 also can be identified in response to the processor circuit 22 detecting a channel change, etc. Hence, the processor circuit 22 can create in step 48 the corresponding data structure 40b that specifies the corresponding video identifier 50b.

During the presentation of the addressable video stream 36b, the user 16a can become bored or distracted and begin supplying a user input 56c as an electronic game input to the game console 14e to initiate or resume execution of an identifiable electronic game. In response to the device interface circuit 20 detecting in step 54 that the user 16a supplies the user input 56c to the game console 14e during presentation of the addressable video stream 36b, the processor circuit 22 can associate in step 60 the user input 56c with the position 58c of the addressable video stream 36b coinciding with the time that the user input 56c was detected by the device interface circuit 20, and update in step 62 the corresponding data structure 40b with the corresponding user input entry 64: the user input 56c stored in the data structure 40b can specify specific information about the electronic game input, including a game identifier specifying the identifiable electronic game executed on the game console 14e, scene identifier, etc, enabling the processor circuit 22 to determine whether the electronic game input 56c is relevant to the addressable video stream 36b, described below.

The foregoing steps can be repeated in response to the processor circuit 22 identifying the user sending via the computer 14b a text-based instant message 56d to a messaging server (e.g., 18') at the position 58d of the addressable video stream 36a, or the user 16a generating via the computer 14b a bookmark command to save a reference to the video identifier 50a and the associated position 58e, resulting in the processor circuit 22 updating the data structure 40a accordingly. Similar operations can be performed by the processor circuit 22 in response to identifying the user 16a supplying to the computer 14b a web request (e.g., hypertext transport protocol (HTTP) request) 56f to a web server (e.g., 18') at the position 58f during presentation of the addressable video stream 38c having the corresponding video identifier value 50c of "51324", resulting in generation and updating of the data structure 40c. The processor circuit 22 also can associate in step 60 user inputs that are supplied by the user 16a within the detection interval but following the end of the presentation of the addressable video stream (e.g., within a prescribed time interval), based on determining a relevance between the user input (e.g., matching text, matching destinations, etc.) and metadata tags describing events at positions 58 within the addressable video stream. Hence, the processor circuit 22 can associate in step 60 certain user inputs following the end of the presentation based on a determined relevance between the user input and the addressable video stream.

As illustrated in FIGS. 4A and 5, the processor circuit 22 of the server 18a creates in step 48 a data structure 40d in response to detecting the addressable video stream 36d having the video identifier value 50d of "37513". No user input 56 is detected by the device interface circuit 20 in step 54 during presentation of the addressable video stream 36d (or a prescribed time interval following the presentation thereof). Hence, the processor circuit 22 in step 69 detects the end of the detection interval for the addressable video stream 36d with no detected user input 56, and updates in step 70 the data structure 40d with a null input field 72 specifying a determined absence of any user input during the detection interval of the corresponding addressable video stream 36d. Hence, the null input field 72 indicates that no user input was supplied by the user 16a during the detection interval of the corresponding addressable video stream 36d.

Assuming in step 66 of FIG. 3A that the processor circuit 22 is not configured for locally executing attention level identification as described below, the processor circuit 22 outputs to a prescribed destination (e.g., 18') in step 74 at least one of the data structures 40a, 40b, 40c, and 40d as the end of the presentation of the corresponding addressable video stream 36 is reached, or at the end of the detection interval encompassing the presentation of the addressable video stream 36 and a prescribed time interval for detecting relevant user inputs: each data structure 40 output in step 74 includes the corresponding video identifier value 50, and either a null input field 72 or a detected input field 76 specifying that the user supplied a user input relative to the presentation of the corresponding addressable video stream. If the data structure 40 includes a detected input field 76, the data structure also is output with any detected user inputs 56 and the respective coinciding positions 58 of the addressable video stream. Hence, the prescribed destination 18' is able to identify the attention level by the user 16a toward the addressable video streams 36a, 36b, 36c, and 36d based on evaluating the user inputs 56, described below.

FIG. 3B illustrates the steps that can be performed by the processor circuit 22 in the server 18a or the server 18' in identifying the attention level by the user 16a toward at least portions of the addressable video streams 36 based on interpreting the data structures 40, according to an example embodiment. In particular, at least one input 56 (or each input 56) by a user 16 for a given addressable video stream 36 can be analyzed or interpreted to identify a corresponding user input attention level metric 90 that indicates the attention level by the user 16 toward the corresponding identified position 58: the user input attention level metrics 90 for the respective positions 58 of an addressable video stream 36 can be aggregated to determine a net attention level (NAL) metric 84 for the addressable video stream 36. As described below, the net attention level metric 84 can be calculated based on applying a weighting factor 93 to the corresponding user input attention level metric 90, where the weighting factor 93 identifies a relative importance of the event presented at the corresponding position 58 of the addressable video stream 52.

The processor circuit 22 in the server 18a or the server 18' can access in step 80 any one of the data structures 40 (e.g., 40a, 40b, 40c, and/or 40d), for example in response to a specific request to parse the data structure 40, or based on real-time analysis of the user inputs 56 as the respective entries 64 are added to the data structures 40. The processor circuit 22 also can initiate accessing of the data structure 40 in response to a detected and of presentation in step 68 of FIG. 3A.

The processor circuit 22 determines in step 80 whether the accessed data structure 40 includes a null input field 72, or a detected input field 76. As illustrated in FIG. 4A, the null input field 72 in the data structure 40d specifies a determined absence of any user input 56 relative to the presentation of the corresponding addressable video stream 36d, identified by its corresponding video identification value 50d "37513". In contrast, each of the data structures 40a, 40b and 40c specify a detected input field 76 specifying that the user 16 supplied a user input 56 relative to the presentation of the corresponding addressable video stream 36 (e.g., either during the presentation or within the prescribed time interval following the presentation). As described previously, a user identifier for identifying the corresponding user 16 having supplied the input 56 can be added to a data structure 40 in order to enable the server 18' to update user selection preferences 34, or for demographic-based marketing analysis; alternately, any user identifier can be omitted for anonymous attention tracking and analysis.

Assuming in step 80 that the processor circuit 22 detects from the data structure (e.g., 40d) the null input field 72 indicating a determined absence of any user input, the processor circuit 22 can identify in step 82 a net attention level metric 84 that identifies the attention level for the overall presentation of the corresponding addressable video stream (e.g., 36d): as described previously, the processor circuit 22 can identify a relatively moderate net attention level metric 84 (e.g., "Net Attention Level="+2") based on concluding that the user 16 (e.g., 16a) was paying attention to the addressable video stream 36d and consequently did not interact with any other user input device 14. Hence, the net attention level metric 84 serves as a metric specifying the attention level of the user 16 (e.g., 16a) toward the overall presentation of the addressable video stream (e.g., 36d). The processor circuit 22 can add the net attention level metric 84 in step 86 to the data structure 40d, as illustrated in FIG. 4A, prior to outputting in step 108 the updated data structure 40d as illustrated in FIG. 4A to a prescribed destination such as the server 18'. Hence, attention levels can be identified by the server 18a located at the user premises 19a even based on a determined absence of any user inputs relative to the presentation of the corresponding addressable video stream 36d.

Assuming in step 80 that the processor circuit 22 of the server 18a or the server 18' detects a detected input field 76 indicating at least one user input entry 64 is enclosed, the processor circuit 22 of the server 18a or the server 18' can parse in step 88 at least one of the user input entries 64 in order to identify the corresponding attention level; alternately, the processor circuit 22 can parse each user input entry 64 in order to determine each of the user input attention level metrics 90 for each corresponding user input 56 specified in the accessed data structure (e.g., 40a).

For example, the processor circuit 22 can first determine in step 91 whether a user input (e.g., 56a, 56b, or 56e of FIG. 5) is a display control command from a user video display control device that received user selection inputs as described above with respect to step 42: if in step 91 the user input (e.g., 56a) is a display control command from a user video display control device that received user selection inputs (e.g., the remote control 14a), the processor circuit 22 can identify in step 92 the attention level from the display control command according to prescribed mapping. In particular, certain user inputs used to directly control the presentation of an addressable video stream 36 directly correspond to an increased attention level, for example: a user input for a volume change (increased volume); a user input for a display screen size change (an increased or maximized screen size); a favorable navigation control input (e.g., pause followed by resume or play, slow-motion controls, scan back (repeat or replay), return to last (prior) scene); or a command to save a position 58 of an identified addressable video stream 36 to a "favorites" folder (i.e., "bookmarking" a position 58).

Conversely, other user inputs used to directly control the presentation of the addressable video stream 36 directly correspond to a decreased attention level, for example a user input for a decreased volume (or mute) or a decreased screen size (e.g., reducing the display into a smaller window of the picture-in-picture display), an unfavorable navigation control (e.g., fast-forward, skip scene, or channel change), or a request to block content. As illustrated in FIG. 4B, different user input attention level metrics 90 can be assigned for detected display control commands (e.g., volume increase, maximizes screen, bookmark scene, volume decrease, etc.). Although not shown in FIG. 4B, other attention levels 84 or 90 can be derived based on user inputs, for example based on a percentage of the content that is viewed by the user, etc.

The processor circuit 22, upon identifying the attention levels for any one of the display control commands, can add in step 86 the corresponding user input attention level value 90 to the corresponding user input entry 64, and update the (weighted) net attention level (NAL) metric 84. As described below, the corresponding weighting factor 93 for the corresponding position 58 specified in the relevant user input entry 64 can be obtained from metadata in the addressable video stream 52.

Referring to step 91 of FIG. 3B, the processor circuit 22 also can identify attention levels from the user inputs (e.g., 56c, 56d, or 56f of FIG. 5) that are from user devices distinct from any video display or video control, for example an IP telephone 14c or a personal computer 14b that is not related to the presentation of the addressable video stream on a television 15. In this example, if in step 94 the processor circuit 22 has access to a user input interpreter (e.g., a text analysis resource and/or a speech to text resource implemented as executable code or hardware circuitry), the processor circuit 22 can retrieve metadata tags in step 96 that identify prescribed keywords associated with the corresponding addressable video stream 36 (e.g., 36a): the prescribed keywords can include keywords for a title of the addressable video stream, actor names, character names, storylines, scene locations, quotes by characters in the addressable video stream, etc.

The processor circuit 22 also can interpret in step 98 (via its interpreter) the user input 56 specified in the data structure 40 in order to determine the content of the user input, for example a web request to a destination website, text messages (e.g., short message service (SMS), e-mail or instant messages) or an outgoing Voice over IP media stream translated using speech to text (STT). The processor circuit 22 also can interpret in step 98 any responses to the user input 56 from a destination and stored in the corresponding user input entry 64: although not illustrated in FIG. 4B, a user input entry 64 of a data structure 40 also can include a response to the corresponding user input that is received by the user premises 19a, for example a web page output by a web server (e.g., 18') in response to the web request, a text message output by a messaging server (e.g., 18') in response to the text message output by the user 16a, or an incoming Voice over IP (VoIP) media stream received from a Voice over IP server (e.g., 18' or 18b) and translated using STT.

Hence, the processor circuit 22 can determine in step 100 if there are any matches between any of the interpreted user inputs or associated responses (e.g., web pages, text-based messages, or VoIP media streams from the server 18' or 18b) and any of the metadata tags identifying prescribed keywords associated with the addressable video stream (e.g., 36a): any user inputs 56 or responses from a destination server (e.g., 18' or 18b) interpreted as resulting in a match with the metadata (indicating the user input 56 is relevant to the content in the addressable video stream) can be used to identify a corresponding positive user input attention level metric 90, whereas user inputs 56 or responses that do not result in a match (indicating the user input 56 is not relevant to the content in the addressable video stream) can be used to identify a corresponding negative user input attention level metric 90. The identified user input attention level metric 90 can be added in step 86 to the corresponding user input entry 64, as illustrated in FIG. 4B, and updating the net attention level value 90 updated based on adding the (weighted) user input attention level metric 90.

Hence, the processor circuit 22 can be configured for interpreting user inputs and responses, including text-based messages, web requests, and Voice over IP conversations and their respective responses in order to determine whether the user 16a is using one of the user input devices (e.g., a personal computer 14b, a telephone 14c, or a web-enabled cell phone 14d) in order to perform an activity that is related to the addressable video stream (e.g., 36a): a determined match in step 100 between the user inputs 56 (or associated responses) and metadata tags describing the addressable video stream 36 demonstrate a higher attention level based on the user activity being related to the addressable video stream 36, whereas no match between a user input 56 and the metadata tags indicates the user is engaged in activity that is unrelated to the addressable video stream 36, resulting in a negative user input attention level metric 90.

The processor circuit 22 also can be configured for determining whether a user activity is relevant to an addressable video stream 36, even without the use of a user interpreter in step 94. In particular, the processor circuit 22 of the server 18a can determine that a given user input (e.g., 56d) is a message (e.g., a text-based instant message) generated by the user 16a and is destined for a second user (e.g., 16b) who is reachable via a peer server 18b via the wide area network 12. Hence, the processor circuit 22 of the server 18a can send in step 102 a query to the peer apparatus 18b as to whether the second user 16b is concurrently watching the same addressable video stream 36, identifiable by its corresponding video identifier value 50: if the peer apparatus 18b sends a reply that the second user 16b is not concurrently watching the same addressable video stream 36, the peer apparatus 18b can send a supplemental reply if the second user 16b subsequently selects the addressable video stream 36 (for example if the second user 16b selects the same addressable video stream 36 in response to the received message from the first user 16a). In the case of client-server interactions between the server 18 and a destination server (e.g., 18') offering a destination service (e.g., a website service such as a social networking site or a movie rental site), the processor circuit 22 of the server 18a also can send to the other server (e.g., a web server) 18' a query as to whether a destination service offered by the destination server is related to the addressable video stream, where the addressable video stream 36 is identifiable by its corresponding video identifier value 50 or by the metadata tags as described with respect to step 96.

In response to the processor circuit 22 of the server 18a receiving a reply to the query (e.g., from the peer server 18b or from another server 18' in the wide area network 12), the processor circuit 22 of the server 18a can identify in step 104 the appropriate user input attention level metric 90 based on whether the destination user 16b is concurrently watching the same addressable video stream (e.g., the same television show) as the local user 16a, or based on whether the destination service is related to the addressable video stream 36. Hence, the processor circuit 22 can identify a positive user input attention level metric 90 for the corresponding user input entry 64 based on a determined relevance of the user input 56 toward content presented in the addressable video stream 36 at the corresponding position 58, or a negative user input attention level metric 90 for a corresponding user input entry 64 based on a determined absence of any relevance between the user input 56 and the addressable video stream 36. As apparent from the foregoing, the determined relevance can be provided for any service, including web-based services, or gaming services that utilize destination servers. In addition, if the user input 56 (e.g., a game input 56c) stored in the data structure 40 does not specify sufficient metadata, the query in step 102 can be sent to the user device having received the user input 56 (e.g., game console 14e), enabling the processor circuit 22 to identify whether the user input is relevant, for example whether the user 16 supplying the user input 56c to the game console 14e is playing a game that is related to the corresponding addressable video stream 36b.

The processor circuit 22 adds in step 86 the attention level metric 90 identified in step 104 for the corresponding user input (e.g., 56d) to the data structure (e.g., 40a) created for the corresponding addressable video stream (e.g., 36a), and updates the net attention level value 90 with the (weighted) attention level metric 90 identified in step 104. If in step 106 the processor circuit 22 determines that the end of the presentation is reached for the addressable video stream (e.g., 36a), the processor circuit 22 outputs in step 108 the corresponding data structure (e.g., 40a) to a prescribed destination, for example the server 18' for collection of the attention metrics. As described previously the collected attention metrics can be used to determine content popularity for advertisement revenue, identification of user preferences, etc.

As illustrated in FIG. 4B, any one of the data structures (e.g., 40a) can specify a weighting parameter 93, retrieved by the processor circuit 22 from the metadata associated with the addressable video stream, that identifies a relative importance of the corresponding event presented at the corresponding position 58. For example, a important event in the addressable video stream 52 can be assigned by the corresponding metadata tags a weighting factor of "10" (indicating a very important event), whereas a relatively unimportant event (e.g., final credits at the end of the presentation) can be assigned a weighting factor of "1" (indicating a minimally-important event); hence, the net attention level 84 can be calculated based on an accumulation in step 86 of FIG. 3B of weighted attention level metrics, where each weighted attention metric can be based on the user input attention level metric 90 multiplied by the corresponding weighting factor specified by the metadata tags of the addressable video stream 52.

According to example embodiments, attention level metrics for addressable video streams presented to a user can be automatically identified based on associating user activities with identified positions of addressable video streams presented to the user.

Numerous variations can be implemented within the example embodiments. Various user inputs can be analyzed and/or interpreted to determine a user attention level, for example: a user forwarding, to another individual, content presented in the addressable video stream (e.g., a screenshot or miniclip of the content) or an identifier for reaching the content (e.g., a uniform resource identifier or cable channel identifier, etc); a user redirecting content from one display device to another display device (e.g., redirect content from a mobile phone in a vehicle to a vehicle screen); a user supplying one or multiple votes (e.g., via a telephone 14c, a web browser 14b, etc.) to a prescribed vote collection destination advertised in the addressable video stream, etc.

In the example of voting, the user inputs can be detected as relevant to the addressable video stream, even though the user inputs are supplied after the presentation of the addressable video stream, based on the apparatus 18 associating the addressable video stream with the vote collection destination (e.g., within two hours after completion of the presentation of the addressable video stream). Hence, a user input that is supplied hours after presentation of the addressable video stream can be used to determine the user attention level, if the user input has sufficient information (e.g., prescribed destination) that enables the apparatus 18 to associate the destination of the user input with the addressable video stream (e.g., prescribed destination of user input matches advertised vote collection destination advertised to user and specified in metadata of addressable video stream). In addition, multiple voting options offering respective vote collection destinations (e.g., dial a first number to vote for contestant 1, dial a second number to vote for contestant 2, etc.) enables the apparatus 18 to determine the attention level for an identifiable position of the addressable video stream (e.g., the portion associated with contestant 1) based on the corresponding vote collection destination chosen by the user.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    identifying, by an apparatus at a user premises, a presentation of an addressable video stream to a user by a first user device at the user premises;
    detecting by the apparatus, relative to the presentation, whether the user has supplied a user input to at least one user input device at the user premises, the user input device distinct from the first user device and not related to the presentation of the addressable video stream by the first user device, the user input distinct from any display control command used for controlling the presentation, the user input representing content that is generated by the user using a service, distinct from the presentation, for delivery of the content to a destination external to the user premises;
    the apparatus selectively associating the user input detected relative to the presentation with a corresponding identified position of the addressable video stream; and
    generating, by the apparatus, a data structure enabling identification of an attention level by the user toward the identified position of the addressable video stream, the data structure specifying an identifier for the addressable video stream, at least one user input, and the corresponding identified position.

2. The method of claim 1, further comprising identifying by the apparatus the attention level for at least one identified position based on determining a relevance of the at least one user input toward content presented in the addressable video stream.

3. The method of claim 2, wherein the identifying the attention level includes:
retrieving metadata identifying prescribed keywords associated with the addressable video stream; and
determining the relevance for the at least one user input based on determining whether the at least one user input specifies at least one of the prescribed keywords, or whether the at least one user input is supplied to a destination that returns a response that specifies at least one of the prescribed keywords.

4. The method of claim 3, wherein:
the at least one user input is a web request, the destination is a website, and the corresponding response is a web page supplied by the website to the user input device;
the at least one user input is a text-based message, the destination is a messaging server and the corresponding response is a second text-based message responsive to the at least one user input; or
the at least one user input is a first Voice over IP media stream generated by the user input device, the destination is a Voice over IP server, and the corresponding response is a second Voice over IP media stream received from the Voice over IP server.

5. The method of claim 2, wherein the identifying the attention level includes:
determining the at least one user input is a message generated by the user and destined for a second user reachable via a peer apparatus via a wide area network;
sending a query to the peer apparatus whether the second user is viewing the addressable video stream; and
receiving a reply from the peer apparatus identifying whether the second user is viewing the addressable video stream, the relevance for the at least one user input based on whether the user and the second user are concurrently viewing the addressable video stream.

6. The method of claim 2, wherein the user input is an electronic game input for an identifiable electronic game, the relevance determined based on determining whether the identifiable electronic game is related or unrelated to the addressable video stream.

7. The method of claim 1, wherein the user input device is a video display control device, the detecting includes interpreting the user input as a display control command including any one of a volume change, a display screen size change, or a navigation control input for navigating within the addressable video stream.

8. The method of claim 1, wherein the generating includes outputting the data structure via an Internet Protocol (IP) based wide area network to a prescribed destination configured for identifying the attention level based on the identifier for the addressable video stream and the data structure specifying whether the user supplied any user input relative to the presentation.

9. The method of claim 1, wherein the generating includes:
storing, in the data structure, attention level metrics for user inputs, including the at least one user input, detected relative to respective positions of the addressable video stream, and
storing in the data structure an aggregated attention level determined based on an accumulation of the attention level metrics relative to respective weighting factors associated with the respective positions.

10. An apparatus comprising:
a device interface circuit configured for detecting a presentation of an addressable video stream to a user by a first user device at a user premises, and detecting whether the user has supplied a user input to at least one user input device at the user premises, the user input device distinct from the first user device and not related to the presentation of the addressable video stream by the first user device, the apparatus located at the user premises, the user input distinct from any display control command used for controlling the presentation, the user input representing content that is generated by the user using a service, distinct from the presentation, for delivery of the content to a destination external to the user premises; and
a processor circuit configured for identifying the presentation of the addressable video stream and selectively associating the user input detected relative to the presentation with a corresponding identified position of the addressable video stream;
the processor circuit further configured for generating a data structure enabling identification of an attention level by the user toward the identified position of the addressable video stream, the data structure specifying an identifier for the addressable video stream, at least one user input, and the corresponding identified position.

11. The apparatus of claim 10, wherein the processor circuit is configured for identifying the attention level for at least one identified position based on determining a relevance of the at least one user input toward content presented in the addressable video stream.

12. The apparatus of claim 11, wherein the processor circuit is configured for:
retrieving metadata identifying prescribed keywords associated with the addressable video stream; and
determining the relevance for the at least one user input based on determining whether the at least one user input specifies at least one of the prescribed keywords, or whether the at least one user input is supplied to a destination that returns a response that specifies at least one of the prescribed keywords.

13. The apparatus of claim 12, wherein:
the at least one user input is a web request, the destination is a website, and the corresponding response is a web page supplied by the website to the user input device;
the at least one user input is a text-based message, the destination is a messaging server and the corresponding response is a second text-based message responsive to the at least one user input; or
the at least one user input is a first Voice over IP media stream generated by the user input device, the destination is a Voice over IP server, and the corresponding response is a second Voice over IP media stream received from the Voice over IP server.

14. The apparatus of claim 11, wherein the processor circuit is configured for:
determining the at least one user input is a message generated by the user and destined for a second user reachable via a peer apparatus via a wide area network;
sending a query to the peer apparatus whether the second user is viewing the addressable video stream; and
receiving a reply from the peer apparatus identifying whether the second user is viewing the addressable video stream, the relevance for the at least one user input by the processor circuit based on whether the user and the second user are concurrently viewing the addressable video stream.

15. The apparatus of claim 11, wherein the user input is an electronic game input for an identifiable electronic game, the relevance determined based on the processor circuit determining whether the identifiable electronic game is related or unrelated to the addressable video stream.

16. The apparatus of claim 10, wherein the user input device is a video display control device, the processor circuit configured for interpreting the user input as a display control command including any one of a volume change, a display screen size change, or a navigation control input for navigating within the addressable video stream.

17. The apparatus of claim 10, wherein the processor circuit is configured for outputting the data structure via an Internet Protocol (IP) based wide area network to a prescribed destination configured for identifying the attention level based on the identifier for the addressable video stream and the data structure specifying whether the user supplied any user input relative to the presentation.

18. The apparatus of claim 10, wherein the processor circuit is configured for generating the data structure based on:
   storing, in the data structure, attention level metrics for user inputs, including the at least one user input, detected relative to respective positions of the addressable video stream; and
   storing in the data structure an aggregated attention level determined based on an accumulation of the attention level metrics relative to respective weighting factors associated with the respective positions.

19. An apparatus comprising:
   a device interface circuit configured for detecting a presentation of an addressable video stream to a user by a first user device at a user premises, and detecting whether the user has supplied a user input to at least one user input device at the user premises, the user input device distinct from the first user device and not related to the presentation of the addressable video stream by the first user device, the apparatus located at the user premises, the user input distinct from any display control command used for controlling the presentation, the user input representing content that is generated by the user using a service, distinct from the presentation, for delivery of the content to a destination external to the user premises; and means for identifying the presentation of the addressable video stream and selectively associating the user input detected relative to the presentation with a corresponding identified position of the addressable video stream;
   the means for identifying further configured for generating a data structure enabling identification of an attention level by the user toward the identified position of the addressable video stream, the data structure specifying an identifier for the addressable video stream, at least one user input, and the corresponding identified position.

20. Logic encoded in one or more non-transitory tangible media for execution and when executed operable for:
   identifying, by an apparatus executing the logic at the user premises, a presentation of an addressable video stream to a user by a first user device at the user premises;
   detecting by the apparatus, relative to the presentation, whether the user has supplied a user input to at least one user input device at the user premises, the user input device distinct from the first user device and not related to the presentation of the addressable video stream by the first user device, the user input distinct from any display control command used for controlling the presentation, the user input representing content that is generated by the user using a service, distinct from the presentation, for delivery of the content to a destination external to the user premises;
   the apparatus selectively associating the user input detected relative to the presentation with a corresponding identified position of the addressable video stream; and
   generating, by the apparatus, a data structure enabling identification of an attention level by the user toward the identified position of the addressable video stream, the data structure specifying an identifier for the addressable video stream, at least one user input, and the corresponding identified position.

21. The method of claim 9, wherein at least one of the attention level specifies a negative value indicating a reduced interest by the user toward the corresponding position of the addressable video stream.

22. The apparatus of claim 18, wherein at least one of the attention level specifies a negative value indicating a reduced interest by the user toward the corresponding position of the addressable video stream.

* * * * *